3,817,789
COMPRESSED POWDER ELECTRODE
Robert E. Stark, Littleton, and Phillip A. Grossman, Lakewood, Colo., assignors to The Gates Rubber Company, Denver, Colo.
Filed May 13, 1971, Ser. No. 143,058
Int. Cl. H01m 43/04
U.S. Cl. 136—28                                                     32 Claims

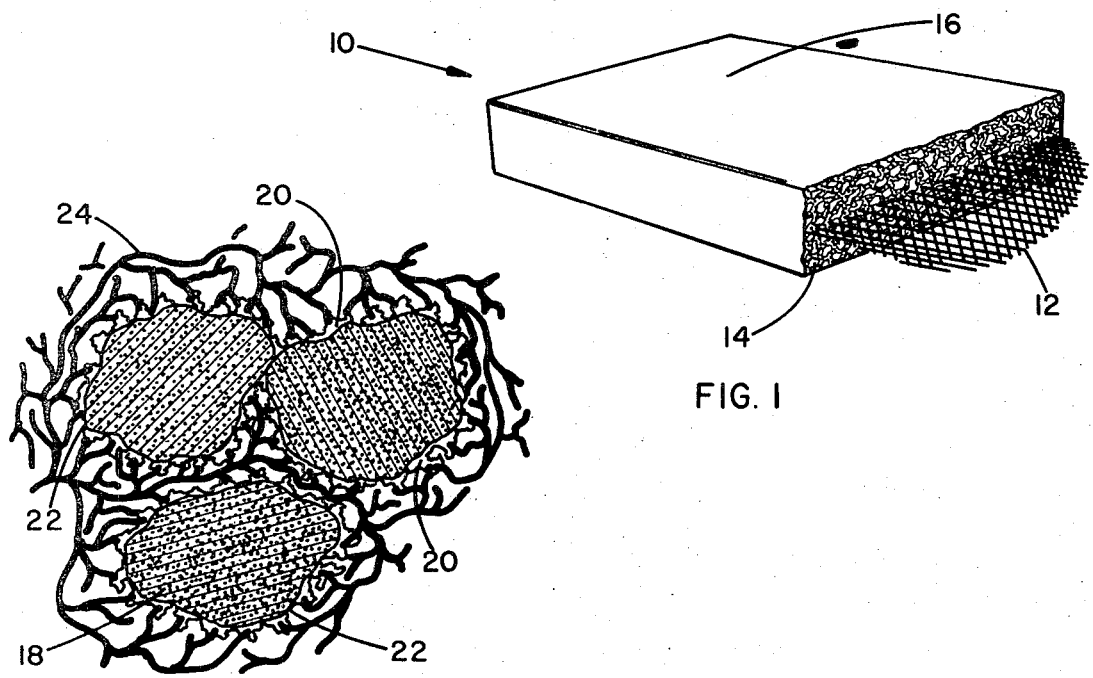
FIG. 1
FIG. 2
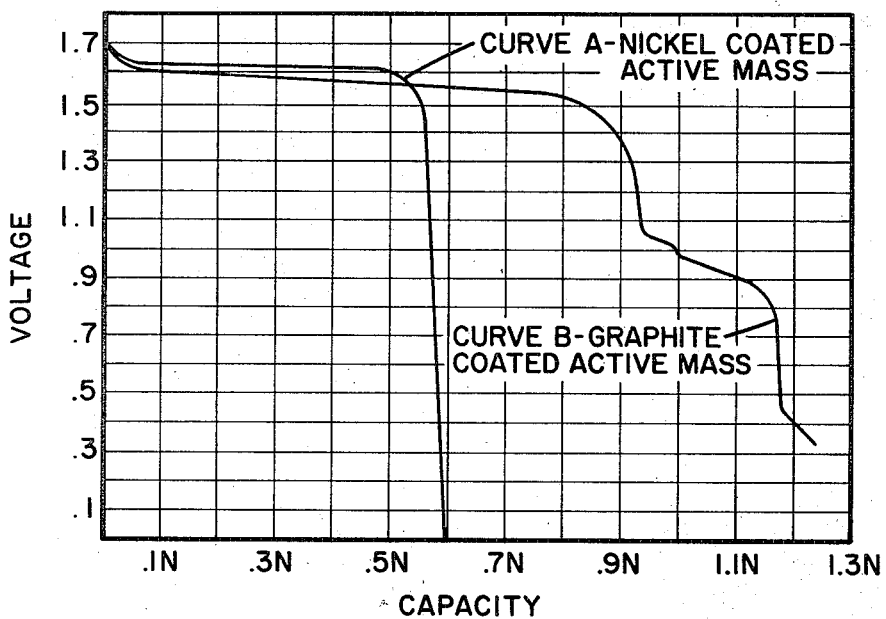
FIG. 3

ABSTRACT OF THE DISCLOSURE

An electrode of the compressed powder type for an electrolytic cell and a process for its manufacture is described, the electrode including (1) an active mass, e.g., nickel hydrate, coated with a porous layer of electrically conductive carbonaceous material, e.g., graphite, (2) and in admixture therewith an electrically conductive material having an arborescent structure, e.g., certain carbonyl metal powders, and (3) a conductive substrate on which a layer of the mixture has been applied under elevated pressure. These electrodes are economically manufactured, and find use in a number of electrolytic cells and are characterized by high discharge capacities and mechanical integrity.

BACKGROUND OF THE INVENTION

This invention relates to electrodes for electrolytic cells, and especially relates to electrodes comprised of powder compressed on a collector/substrate.

Two of the most commonly employed electrodes are the sintered and pressed powder type. The sintered type has proved to be a good electrode providing relatively good discharge capacities and excellent mechanical integrity. But its method of manufacture involves a number of critical steps requiring significant time, expense, and precise control before a suitable electrode is completed.

The powder type electrode, which may be of the pocket plate, tube, or pressed powder variety, generally requires a conductive powder filler (e.g. nickel flake, graphite flake, or powder) to establish an electrical path from the electrode collector to the active material. The flakes or particles of conductor touch a particle of active material usually at only a few spots on its surface. The conductivity of the electrode can be increased by increasing the ratio of conductor to active material to thereby increase the number of contact points between conductor and active material. The result, however, is to lower the energy density of the electrode. It is another common expedient in pressed powder electrodes to mix a plastic resin, wax, or other polymeric binder or cement with the conductor flakes or powder to adhesively bind the components of the electrode and give it a desirable flexibility. However, use of such a plastic binder is disadvantageous from at least two standpoints: (1) the plastic material tends to oxidize in the cell, with attendant problems e.g., carbonate formation; and (2) the plastic material tends to encapsulate the active material in an insulating layer, thereby cutting it off from participation in the electrode reactions and thus lowering the discharge capacity of electrode.

U.S. Pat. No. 3,305,401 (to Aulin), while generally teaching a preference to employ a pasted type electrode in which a polymeric binder is employed, does teach the improvement of coating the active mass with a metal such as nickel, and the use of metal or metal fibers mixed into the active mass to improve electrical contact. The state of the art is also exemplified by the following references: U.S. Pats. Nos. 839,371; 2,678,343; 3,113,050; 3,230,113; and 3,347,707.

Among the objects of the invention are to overcome the drawbacks of the prior art and to provide an electrode of superior conductivity, discharge capacity, cycle life and mechanical integrity. It is another object to avoid the use of a binder in the electrode mixture, yet obtain desirable flexibility. It is still a further object to provide an electrode whose discharge curve tapers off rather gently, and preferably in a stepwise manner to signal the end of discharge, rather than dropping off sharply in an avalanche manner as in prior art electrodes; thus, minimizing the prospect of over-discharging the cell.

SUMMARY OF THE INVENTION

Briefly described, the invention entails a process for the preparation of an electrode of the compressed powder type including the steps of (1) applying a porous coating of electrically conductive carbonaceous material to an active particulate mass; (2) blending the thus formed coated active mass with an electrically conductive material possessing an arborescent structure to form an intimate mixture; and (3) applying the mixture to a conductive substrate (current collector) under elevated pressure. The invention also includes the electrode made according to the aforementioned process, and to electrolytic cells incorporating the electrode.

An example of an electrode made according to the invention is a pressed powder nickel electrode useful in a variety of cells including nickel-cadmium and nickel-zinc rechargeable alkaline battery cells. These electrodes may be used as flat plates, spirally wound into cylindrical cells, or in other configurations.

BRIEF DESCRIPTION OF THE DRAWINGS

The invention will be more readily understood by reference to the accompanying drawings, in which like numerals designate like parts in the several figures, and wherein:

FIG. 1 is a partial cut-away perspective view of an electrode of the invention;

FIG. 2 schematically depicts in partial section a magnified view of the electrode mixture; and FIG. 3 is a graph comparing the discharge curves of electrodes having a metal coated active mass vs. electrodes having a graphite coated active mass according to the invention.

PREFERRED EMBODIMENTS OF THE INVENTION

Electrodes of the invention generally employ an active mass in a finely divided particulate form, such as a finely divided powder or crystals. Although not narrowly critical, it is preferred that the active particulate mass have average particle sizes in the range of about 0.01 to 100 microns and more preferably from about 0.1 to 50 microns. A variety of types of active mass may be employed which are capable of being incorporated into a compressed powder type electrode. Examples include oxygen compounds of nickel such as nickel hydrate and nickel hydroxide, manganese oxides, lead oxides, silver oxides, mercuric oxides, and cadmium and its oxides, and compatible mixtures thereof.

Intimate electrical contact with the active mass at a number of contact points is effected by applying a coating thereon of an electrically conductive carbonaceous material. It is critical that this coating be porous and permeable to electrolyte to allow participation in the electrode reactions. The carbonaceous material must be electrically conductive and capable of being coated on the active particulate mass. Examples of such materials include carbon black, graphite, lamp black, acetylene black, carbon graphite, fibrous carbon products, and compatible mixtures thereof. Graphite is particularly useful because of its availability and good electrical conductivity.

Any of a number of types of methods may be employed to apply the carbonaceous material as the coating on the active particulate mas. For example, one may use a hammer mill, jet mill, ball type mill employing balls, rocks, etc. putty chaser type mixers, or mix mullers. In this manner, there is a mechanical joining of the carbonaceous material and active mass. The duration of mixing, mulling or other coating operation will determine the porosity of the applied coating. Too short an application time will produce an insufficient number of contact points, whereas too long an application time will produce a coating with insufficient porosity. A desirable balance should be struck so as to have sufficient contact points yet preserve a desirable porosity. For most active masses, the mixing or mulling operation is carried on for a period of at least 9 hours, more preferably from about 16 to about 43 hours.

In addition to the coated active mass, the electrode mixture comprises an electrically conductive material which acts as an electrical conductive bridge between the coated active mass and a suitable electrode current collector. This conductive material has the property of being arborescent, i.e. it is composed of tree-like branches forming a three dimensional interconnecting network of conductive threads or arms. It is this particular structure which synergistically gives the conductive material a binding as well as conductive property. These arborescent branches intimately contact the carbonaceous coating on the active mass at a number of contact points, and further are in self-contact and in contact with the electrode current collector to form a continuous conductive link between active mass and current collector. Typical arborescent materials suitable according to the present invention include carbonyl iron powder, carbonyl nickel powder, electrolytic iron, electrolytic nickel, interlacing graphite fibers, tantalum, and tungsten. This arborescent conductor is blended with the coated active mass in a suitable and conventional manner such as by mixing, shaking together, or folding. While not narrowly critical, and depending on the particular components of the electrode mixture used, it is preferred that the weight ratio of coated active mass to conductive arborescent material be from about 2:1 to about 1:2 and more preferably from about 1.5:1 to about 1:1.5.

The aforementioned electrode mixture consisting of coated active mass and conductive material may additionally comprise any suitable compatible component (excluding any appreciable amount of electrically non-conductive binder such as a plastic resin or wax as previously mentioned). Such additional components would, include, for instance, anti-polar materials. For example, in a nickel cathode which is to be used in an alkaline rechargeable cell, a cathodically reduceable anti-polar mass such as cadmium oxide or cadmium hydroxide is useful to prevent hydrogen generation in the event of a polarity reversal, such as may occur when the cell is over-discharged. A small amount of a reinforcing fiber may also be utilized to increase mechanical strength, reduce spalling, and facilitate spiral winding of the electrode, if desired, and would be exemplified by graphite fibers or Dynel fibers. Any component added to the electrode mixture should be substantially non-interfering with the electrode reactions and compatible with the other components of the mixture.

The electrode mixture is preferably compressed into or onto a suitable conductive substrate (which may also serve as the current collector) such as a pocket plate, tube, thin sheet or flat grid structure such as woven wire screen, perforated sheet metal, etc., or expanded mesh. The substrate should be compatible with the particular electrolyte used and should provide a long lasting base onto which the electrode mixture remains firmly in electrical contact, electrochemically active and reversible throughout the life of the electrolytic cell. The substrate may typically be made of iron, steel, nickel-plated iron or steel, or nickel.

To effect the necessary intimate contact between the various conductive components and active mass of the electrode mixture and substrate, it is necessary to employ elevated pressures, in contrast to the lower pressures generally used previously for this purpose in the prior art. While pressure in general will depend upon the particular components of the electrode mixture and substrate onto which compaction is effected, preferably a pressure of no less than about 25 tons/in.$^2$ of electrode surface will be needed to afford the necessary intimate contact and to preserve mechanical integrity. In the case of a nickel electrode, for example, it is preferred that the pressure applied be at least 30 tons/in.$^2$ of electrode surface, and more preferably at least about 65 tons/in.$^2$ of electrode. This compression may be accomplished by any suitable method, such as by rolling or pressing.

To illustrate one form of the invention, reference is made to FIG. 1 in which the finished electrode is designated at 10 and consists of a wire mesh substrate 12 onto which is compacted an electrode mixture 14 consisting of an active mass coated with carbonaceous material, arborescent conductive fibers, and an anti-polar mass. The surface 16 of the electrode has a shiny appearance partially due to the high compaction pressure utilized.

In FIG. 2, the electrode mixture is shown to consist of active mass 18 with a carbonaceous coating 20 which appears to have a reticulated structure forming pores 22. Interlaced between the coated active mass is a continuity of tree-like conductive particles 24 touching the carbonaceous coating 20 at a number of spots on each active mass particle.

In FIG. 3, comparative average discharge curves are shown for a number of rechargeable alkaline cells having a pressed powder nickel cathode. Curve A represents the case where the active mass (nickel hydrate) is coated with a porous coating of nickel metal, and Curve B represents a nickel electrode having its active mass coated with a porous layer of graphite according to the present invention. Both cells and nickel electrodes are substantially identical otherwise, both electrodes containing about 47% active mass, carbonyl nickel powder, and cadmium oxide as an anti-polar mass. Each cell is discharged at the C rate. The vertical axis of the graph represents voltage, in volts, and the horizontal axis is incremented in fractions of the nominal capacity N of the cell (defined as about 75% of theoretical capacity). As is shown by Curve A, the cell with the electrode having the nickel coated active mass has a steady, relatively high voltage until about 0.5 N and then steeply drops off in a short period of time. In contrast, the cell with the graphite coated active mass in the electrode as represented by Curve B has a fairly steady discharge at about 1.55 to about 1.6 volts for a significantly longer period of time, and then gradually drops off until about 0.925 N at which time the voltage levels off in a stepwise manner until finally dropping off steeply at about 1.15 N. The cell having the graphite coated active mass in the nickel cathode has a much greater overall capacity and approximately a 34% higher capacity to the 1.0 volt level.

The invention is capable of a variety of modifications and variations which will be made apparent to those skilled in the art by a reading of this specification. All such modifications, variations and other equivalents are to be included within the invention as defined by the claims appended hereto.

What is claimed is:

1. A process for the preparation of an electrode of the compressed powder type comprising in sequential order the steps of:
    (a) applying a porous coating of electrically conductive carbonaceous material to an active particulate mass;
    (b) blending the thus formed coated active mass with an electrically conductive material possessing an arborescent structure to form an intimate mixture; and
    (c) applying the mixture to a conductive current collector under pressure of at least about 25 tons/in.$^2$ of electrode surface, said electrically conductive material functioning as an electrical conductive bridge between said coated active mass and said current collector.

2. The process of claim 1 wherein the electrode mixture is devoid of any appreciable amount of electrically non-conductive binder.

3. The process of claim 1 wherein the carbonaceous material is graphite.

4. The process of claim 1 wherein the active mass is selected from the group consisting of nickel oxides, nickel hydroxides, manganese oxides, lead oxides, silver oxides, mercuric oxides and cadmium and its oxides.

5. The process of claim 1 wherein the active mass contains an oxygen compound of nickel.

6. The process of claim 1 wherein the porous coating is obtained by milling or mulling the carbonaceous material with the active particulate mass for a period of at least 9 hours.

7. The process of claim 1 wherein the porous coating is obtained by mulling graphite with the active particulate mass for from about 16 to about 43 hours.

8. The process of claim 1 wherein the weight ratio of coated active mass to arborescent material is from about 2:1 to about 1:2.

9. The process of claim 1 wherein the arborescent material is selected from the group consisting of carbonyl iron powder, carbonyl nickel powder, graphite fibers, electrolytic iron, electrolytic nickel, tantalum, and tungsten.

10. The process of claim 1 wherein the arborescent material is carbonyl nickel powder and the active mass is nickel hydroxide or nickel hydrate coated with a porous layer of graphite, said porous coating having been obtained by intimately mixing the graphite with the active mass for a period of at least 9 hours.

11. An electrode composition of the compressed powder type substantially free of polymeric binder, said electrode comprising:
(a) an active particulate mass whose particles are exclusively coated with a porous layer of electrically conductive carbonaceous material mechanically joined to the particles;
(b) in admixture therewith an electrically conductive material having an arborescent structure; and
(c) a conductive current collector upon which a layer of the mixture has been applied under a pressure of at least 25 tons/in.$^2$, said carbonaceous material providing contact points segregating the arborescent conductive material from the active particulate mass and said electrically conductive material functioning as an electrical conductive bridge between said coated active mass and said current collector.

12. The composition of claim 11 wherein the active mass is an oxygen compound of nickel and the carbonaceous material is graphite.

13. The composition of claim 11 wherein the arborescent material is selected from the group consisting of carbonyl from powder, carbonyl nickel powder, graphite fibers, electrolytic iron, electrolytic nickel, tantalum and tungsten.

14. The composition of claim 11 wherein the arborescent material is carbonyl nickel powder and the active mass is nickel hydroxide or nickel hydrate coated with a porous layer of graphite.

15. The composition of claim 11 wherein there is additionally present an anti-polar mass.

16. An electrochemical cell having as its cathode the electrode of claim 11 in which the active mass is selected from the group consisting of nickel oxides, nickel hydroxides, nickel hydrate, manganese oxides, lead oxides, silver oxides, mercuric oxides and cadmium and its oxides.

17. An electrochemical cell having a nickel cathode as defined in claim 14.

18. The process of claim 10 wherein the mixture is applied to the conductive substrate under pressure of at least 30 tons/in.$^2$ of electrode surface.

19. The process of claim 10 wherein the mixture is applied to the conductive substrate under pressure of at least 65 tons/in.$^2$ of electrode surface.

20. The process of claim 10 wherein the mixture is substantially free of electrically non-conductive binder.

21. A process for the preparation of a compressed powder nickel electrode consisting essentially in sequential order the steps of:
(a) applying a porous coating of electrically conductive carbonaceous material to an electrochemically active nickel mass by intimately mixing for a period of at least about 9 hours the carbonaceous material and nickel mass to mechanically join them together;
(b) blending the thus formed coated active mass with an electrically conductive material possessing an arborecent structure to form an intimate mixture; and
(c) compressing the mixture upon an electrically conductive current collector at a pressure of at least about 25 tons/in.$^2$ of electrode surface, said electrically conductive material functioning as an electrical conductive bridge between said coated active mass and said current collector.

22. The process of claim 21 wherein the mixture is free of electrically non-conductive binder.

23. The process of claim 21 wherein the arborescent material is selected from the group consisting of carbonyl iron powder, carbonyl nickel powder, graphite fibers, electrolytic iron, electrolytic nickel, tantalum, and tungsten.

24. The process of claim 23 wherein the active nickel mass is nickel hydrate.

25. The process of claim 24 wherein the compression is accomplished using pressures of least about 65 tons/in.$^2$ of electrode surface.

26. The process of claim 25 wherein the nickel hydrate and electrically conductive carbonaceous material are intimately mixed by milling or mulling for a period from about 16 to about 43 hours.

27. The process of claim 26 wherein the electrically conductive carbonaceous material is graphite.

28. A nickel electrode composition of the compressed powder type substantially free of binder, said electrode comprising:
an electrochemically active particulate nickel mass whose particles are individually and exclusively coated with a porous layer of electrically conductive carbonaceous material joined to the particles forming a number of contact points on the surface of the active mass;
an electrically conductive arborescent material having a three dimensional interconnecting network of conductive threads or arms which intimately contact the carbonaceous porous coating on the active mass at a number of said contact points, said coated active mass and arborescent material forming a mixture;
a conductive current collector upon which a layer of the mixture has been applied under a pressure of at least 25 tons/in.$^2$ of electrode surface;
said electrode having a discharge curve characterized by an initial gentle tapering followed by a step-wise tapering to signal the end of discharge, said electrically conductive material functioning as an electrical conductive bridge between said coated active mass and said current collector.

29. The electrode composition of claim 28 wherein the arborescent material is selected from the group consisting of carbonyl iron powder, carbonyl nickel powder, graphite fibers, electrolytic iron, electrolytic nickel, tantalum and tungsten.

30. The electrode composition of claim 28 wherein the arborescent material is carbonyl nickel powder and the carbonaceous material is graphite.

31. The electrode composition of claim 30 wherein the active mass is nickel hydrate.

32. An electrochemical cell having the nickel electrode defined in claim 30.

References Cited
UNITED STATES PATENTS

| | | | |
|---|---|---|---|
| 3,230,113 | 1/1966 | Herold | 136—29 |
| 3,108,908 | 10/1963 | Krebs | 136—28 |
| 880,027 | 2/1908 | Jungner | 136—28 |
| 3,023,260 | 2/1962 | Coler et al. | 136—24 |
| 3,060,254 | 10/1962 | Urry | 136—28 |
| 3,317,347 | 5/1967 | Coleman et al. | 136—28 |
| 3,347,707 | 10/1967 | Southworth et al. | 136—28 |
| 2,678,343 | 5/1954 | Daniel | 136—28 |
| 3,262,815 | 7/1966 | Langer et al. | 136—28 |

ALLEN B. CURTIS, Primary Examiner

C. F. LE FEVOUR, Assistant Examiner

U.S. Cl. X.R.

136—29, 121